G. B. SMITH.
WIRE CABLE.
APPLICATION FILED DEC. 26, 1907.
916,048. Patented Mar. 23, 1909.
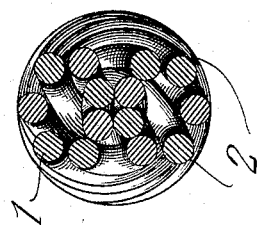
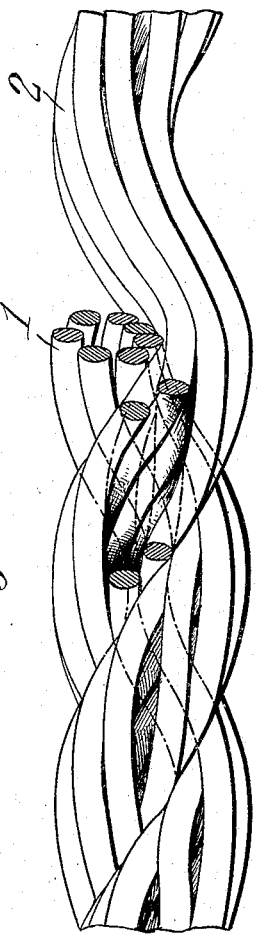
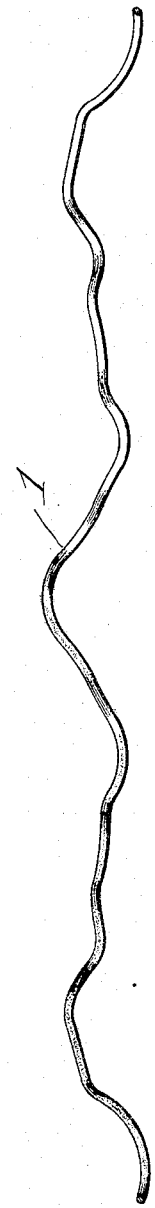
Witnesses
Inventor
Gary B. Smith.
By C. A. Snow & Co
Attorneys

UNITED STATES PATENT OFFICE.

GARY B. SMITH, OF ANOKA, MINNESOTA.

WIRE CABLE.

No. 916,048.         Specification of Letters Patent.         Patented March 23, 1909.

Application filed December 26, 1907. Serial No. 408,219.

*To all whom it may concern:*

Be it known that I, GARY B. SMITH, a citizen of the United States, residing at Anoka, in the county of Anoka and State of Minnesota, have invented a new and useful Wire Cable, of which the following is a specification.

This invention has relation to wire cables and it consists in the novel construction and arrangement of its parts as hereinafter shown and described.

The object of the invention is to provide a cable of the character indicated which is made up of wire strands helically twisted into cable sections, said sections being helically twisted together and forming the cable. The cable sections are formed with open centers or middles and when the said sections are twisted together to form the cable the wires of the sections at the center or middle of the cable are forced in contact with each other and are distorted slightly out of their relative positions in the cable sections whereby a cable is formed having the wires in close contact at its middle and along its entire length with the wires at its periphery spaced apart thus producing a light cable possessing strength and flexibility.

In the accompanying drawing: Figure 1 is a side elevation of a portion of a cable with parts broken away. Fig. 2 is a transverse sectional view of the cable, and Fig. 3 is a side elevation of one of the strands of the cable illustrating the configuration of the same when assembled in the cable.

The cable is made up of the wire strands 1 which in the first instance are helically wound together forming the cable sections 2. The said cable sections are open at their centers or middle and the strands 1 are spaced apart from each other. When the cable sections are thus formed they are straight with substantially circular peripheries. Two cable sections are then helically twisted together as shown in Figs. 1 and 2 and during the process of the last said inter-twisting those wire strands of the opposite cable sections which bear against the strands of the opposite section at the center or middle of the cable are forced in out of the circular alinement of the strands constituting the cable section so that the adjacent sides of the wire strands at the middle of the cable are forced in close contact with each other throughout the entire length of the cable while those wires at the periphery of the cable are spaced apart and maintain the same relative arrangement as when the cable sections were originally formed. Figs. 1 and 2 of the drawing illustrate the relative positions of the strands and the cable section after the cable is formed while Fig. 3 is a side elevation illustrating the configuration of a single strand of wire in the cable as made up.

It will be observed that a line lengthwise of the cable sections and drawn through the points where the strands come in contact with each other are helically disposed along the cable sections and that the cable sections in the made up cable are slightly flattened or distorted out of circular configuration in cross section as illustrated in Fig. 2.

Having described my invention what I claim as new and desire to secure by Letters-Patent is:—

1. A cable formed of inter-twisted wires which are in close contact with each other at the center of the cable and spaced from each other at the periphery of the cable.

2. A cable consisting of strands helically inter-twisted and being in close contact with each other at the center of the cable and spaced from each other at the periphery thereof.

3. A cable consisting of wire strands twisted into cable sections, said sections being inter-twisted so that the strands of each section are in close contact at the middle of the cable and spaced apart at the periphery thereof.

4. A cable consisting of wire strands helically twisted into cable sections, said cable sections being inter-twisted so that the strands of each section at the middle of the cable are in close contact with each other and spaced apart at the periphery of the cable.

5. A cable consisting of wire strands helically twisted into cable sections, said sections being helically twisted to form the cable the strands of each section at the middle of the cable being in close contact with each other and spaced apart at the periphery of the cable.

6. A cable made up of strands formed into cable sections, said cable sections having open centers and peripheries distorted out of circular alinement at the middle of the cable.

In testimony that I claim the foregoing as my own, I have hereto affixed my signature in the presence of two witnesses.

GARY B. SMITH.

Witnesses:
  THOMAS AMLAND,
  J. S. TURNBULL.